May 1, 1928.
W. DÄLLENBACH
1,668,106
HOT WIRE VACUUM METER
Filed May 12, 1924
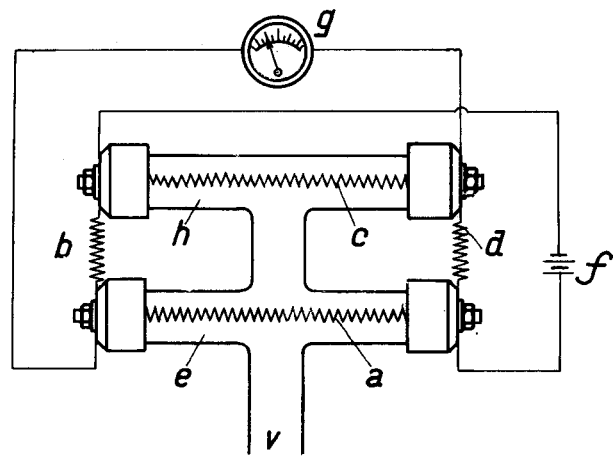
Inventor
W. Dällenbach
By Marks & Clerk
Attys.

Patented May 1, 1928.

1,668,106

UNITED STATES PATENT OFFICE.

WALTER DÄLLENBACH, OF ZURICH, SWITZERLAND, ASSIGNOR TO AKTIENGESELLSCHAFT BROWN BOVERI & CIE., OF BADEN, SWITZERLAND.

HOT-WIRE VACUUM METER.

Application filed May 12, 1924, Serial No. 712,912, and in Germany July 26, 1923.

It is well known that high vacua can be measured with great accuracy by means of a hot wire, because the heat-conductivity of highly rarefied gases diminishes in proportion to their degree of rarefaction. That is to say, that if a conductor through which a constant electric current is flowing and which is thereby heated by the said current, is placed in a vacuum that is to be measured, the amount of heat which the said conductor gives off to its surroundings in a unit of time, will diminish proportionally to the increased degree of vacuum, and therefore the conductor will become hotter as the vacuum increases. If now a conductor having the highest possible temperature-coefficient of its resistance be employed, then the variation in its resistance in dependence upon the vacuum can be accurately measured. Consequently a permanently connected indicating instrument can be calibrated directly for use as a vacuum-meter.

The foregoing is true however only on the assumption that the temperature of the surroundings is exactly constant, which is practically never the case. Recourse might be had to the expedient of enclosing the hot wire vacuum-meter in a thermostat, which although possible in the laboratory, is not practicable for making industrial measurements.

According to the present invention the effect of the surrounding temperature is compensated in a simple manner by measuring the variation in the resistance of the hot wire by the Wheatstone bridge method, the arms of the bridge being made of a material having approximately equal temperature coefficients, and being exposed equally to the influence of the surrounding temperature.

A practical form of this vacuum-meter is illustrated by way of example in the accompanying diagrammatic drawings in which:—

Figure 1 illustrates an apparatus comprising two hot wires.

The apparatus for measuring the vacuum is of the Wheatstone type and comprises four resistor elements, $a$, $b$, $c$, $d$, constituting the arms of the bridge. One set of two opposite resistor arms $a$, $c$, are disposed in the interior of a hermetically closed vessel $e$ which is connected through a pipe $v$ with the space, the vacuum of which is to be determined. The other pair of resistor arms $b$, $d$, are disposed exteriorly of said vessel and are independent of the vacuum conditions in the interior thereof. A source of supply $f$ is connected between one set of diagonally opposite corners of the resistor quadrilateral, while a measuring instrument $g$ is connected to the other set of corners. The current flowing through the resistor arms heats the resistor wires $a$, $c$, in the interior of the vessel, and by comparing the variations of the resistance of said wires with the exterior resistor elements $b$, $d$, the vacuum condition in the interior of the vessel may readily be determined. By using two hot wires $a$ and $c$, that are disposed to the atmosphere that is to be gauged, as mutually opposite arms of the bridge, a high degree of accuracy is obtained. According to the invention, the hot wires are enclosed in two-H-shaped connected cross tubes $e$, $h$, and the ratio arms $b$ and $d$ are fixed between the ends of these cross tubes.

As all four resistances of the bridge should have equal temperature coefficients, and are exposed to the same room temperature, the measuring arrangement is completely compensated for, and insensitive to, fluctuations of the latter, and the indicating instrument $g$ can be calibrated directly as a vacuum-meter and be furnished with a corresponding scale.

The illustrated apparatuses are merely examples of construction. The invention covers constructional examples which may be entirely different in execution.

In theory, the temperature coefficient of the hot wires situated in the vacuum should be somewhat different from the temperature coefficient of the bridge arms that are situated in air. This difference is however so slight that it can be neglected in practice.

What I claim is:—

1. In a hot wire vacuum-meter, the combination of a vacuum vessel of H-shape, having a limb in line with the cross bar of the H for connection to the vacuum chamber whereof the vacuum is to be measured, lead-in terminals on the two end pairs of said vacuum vessel, and a Wheatstone bridge having all its arms composed of conducting material of approximately the same resistance temperature coefficient, whereof the two mutually opposite arms of the bridge quadrilateral constitute two hot wires located inside the legs of said H-shaped vacuum vessel, and the two other arms of said Wheatstone bridge are located between the said terminals outside said vacuum vessel.

2. In a high-vacuum instrument responsive to the conditions of an evacuated space, a hermetically closed vessel, and a pipe extending from said vessel for connection with the evacuated space, said vessel having two pairs of protruding terminal portions, four resistor terminals serially-connected to each other to constitute arms of the Wheatstone bridge, one pair of elements constituting two opposite arms of the bridge being spanned between said protruding portions in the interior of said vessel, the other pair of elements constituting the two other opposite arms of the bridge being spanned between said protruding portions outside said vessel.

3. In a high-vacuum instrument comprising two sets of resistor elements, one of said sets being exposed to an evacuated atmosphere that is to be gauged, the other of said sets being maintained independent of said atmosphere, and means actuated by the relative variation of the resistance of said two sets, a holder constituting a unitary support for said resistor elements comprising a hermetic vessel, a tube extending from said vessel for connection with the space that is to be gauged, and a plurality of insulated lead-in terminals extending through the walls of the vessel, the set of resistor elements that is to be exposed to the atmosphere that is to be gauged being directly held between said terminals in the interior of the vessel, the external set of resistor elements being directly held by said terminals on the exterior of said vessel.

In testimony whereof I have signed my name to this specification.

WALTER DÄLLENBACH.